United States Patent
Osada

(10) Patent No.: US 7,511,383 B2
(45) Date of Patent: Mar. 31, 2009

(54) FLAME RETARDANT AND AN EPOXY RESIN COMPOSITION COMPRISING THE SAME FOR ENCAPSULATING SEMICONDUCTOR DEVICES

(75) Inventor: Shoichi Osada, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 394 days.

(21) Appl. No.: 11/395,216

(22) Filed: Apr. 3, 2006

(65) Prior Publication Data

US 2006/0223913 A1 Oct. 5, 2006

(30) Foreign Application Priority Data

Apr. 4, 2005 (JP) ............................. 2005-107407
Mar. 24, 2006 (JP) ............................. 2006-082688

(51) Int. Cl.
| | |
|---|---|
| *H01L 23/29* | (2006.01) |
| *C09K 21/04* | (2006.01) |
| *C09K 21/10* | (2006.01) |
| *C09K 21/12* | (2006.01) |
| *B32B 5/16* | (2006.01) |
| *C08L 63/00* | (2006.01) |
| *B32B 27/38* | (2006.01) |

(52) U.S. Cl. ................... 257/789; 252/601; 252/604; 252/609; 257/788; 257/793; 257/795; 428/402; 428/403; 428/404; 428/407; 523/440; 523/451; 523/452

(58) Field of Classification Search .............. 428/402.2, 428/402.21, 402.22, 402.24, 403, 404, 407, 428/413, 414, 415, 416, 417, 418; 523/440, 523/451, 452; 252/601, 604, 609; 257/787, 257/788, 789, 793, 795

See application file for complete search history.

(56) References Cited

U.S. PATENT DOCUMENTS 6,335,386 B1 * 1/2002 Kiparissides et al. ........ 523/211
6,783,859 B2 * 8/2004 Osada et al. ................ 428/413
7,122,587 B2 * 10/2006 Shimoda et al. ............. 523/452
2004/0072968 A1 * 4/2004 Shimoda et al. ............. 525/481
2006/0025501 A1 * 2/2006 Osada et al. ................ 523/457
2006/0241250 A1 * 10/2006 Osada et al. ................ 525/481

FOREIGN PATENT DOCUMENTS

| JP | 7-157542 A | 6/1995 |
|---|---|---|
| JP | 10-259292 A | 9/1998 |
| JP | 11-255955 A | 9/1999 |

OTHER PUBLICATIONS

Machine Translation of JP 11-255955, provided by the JPO website (1999).*

* cited by examiner

*Primary Examiner*—Michael J Feely
(74) *Attorney, Agent, or Firm*—Birch, Stewart, Kolasch & Birch, LLP

(57) ABSTRACT

A flame retardant featuring: an inorganic porous fine particle, a phosphazene compound represented by the following average compositional formula (1)

$$N_nP_n \left[ O - \text{\textlangle}\text{\textrangle} - X - \text{\textlangle}\text{\textrangle} - O - \right]_d \left\{ O - \text{\textlangle}\text{\textrangle} \right\}_e \quad (1)$$

(X is a single bond, $CH_2$, $C(CH_3)_2$, $SO_2$, S, O, or $O(CO)O$; n is an integer of from 3 to 1000; d and e are numbers with $2d+e=2n$), and a resin layer. The phosphazene compound is supported on the inorganic porous fine particle, and the resin layer coats the inorganic porous fine particle with the phosphazene compound supported thereon. The resin layer thermally decomposes to lose weight by 10% at a temperature of from 300° C. to 500° C., as measured by thermogravimetry in the air at a heating rate of 10° C./min.

5 Claims, No Drawings

US 7,511,383 B2

FLAME RETARDANT AND AN EPOXY RESIN COMPOSITION COMPRISING THE SAME FOR ENCAPSULATING SEMICONDUCTOR DEVICES

CROSS REFERENCES

This application claims benefits of Japanese Patent application No. 2005-107407 filed on Apr. 4, 2005, and Japanese Patent application No. 2006-082688 filed on Mar. 24, 2006 the contents of which are hereby incorporated by reference.

FIELD OF THE INVENTION

The present invention relates to a flame retardant, specifically to a flame retardant comprising a phosphazene compound supported on a porous particle and a resin layer coating the porous particle with the phosphazene compound supported thereon, which resin layer has predetermined thermal decomposition property. The present invention relates also to a resin composition for encapsulating semiconductor device which composition comprises the flame retardant.

DESCRIPTION OF THE PRIOR ART

Semiconductor devices such as diodes, transistors, ICs, LSIs and VLSIs are mostly encapsulated with an epoxy resin composition. The encapsulated semiconductor devices are used in various living environments such as in home electric appliances and computers and flame retardancy is required in case of fire.

To provide flame retardancy to an epoxy resin composition, halogenated epoxy resin and antimony trioxide are incorporated in the composition. This combination of the halogenated epoxy resin and antimony trioxide shows high radical trapping and air shielding effects in a vapor phase to provide high flame retardancy to the composition.

However, the halogenated epoxy resin emits poisonous gas when it burns and antimony trioxide is hazardous, too. Therefore, it is desired that these flame retardants are not contained in the resin composition from the environmental and safety viewpoint. Moreover, a brominated epoxy resin emits Br radicals at a high temperature which react with Au—Al alloy of a joint of Au wire and Al wire or pad to form Al—Br compound, and thereby impair heat resistance of a semiconductor device encapsulated with a composition comprising the brominated epoxy resin.

To substitute the halogenated epoxy resin or antimony trioxide, hydroxides such as $Al(OH)_3$ and $Mg(OH)_2$, and phosphorous flame retardants such as red phosphorous and phosphates have been studied. However, the hydroxides have low flame retardance, so that a large amount of the hydroxide should be incorporated in a composition to attain desired flame retardance. The large amount of the hydroxide increases a viscosity of the composition, causing voids or wire sweep during a molding process. The phosphorous flame retardants such as red phosphorous and phosphates are hydrolyzed when a semiconductor device is exposed to high humidity to form phosphoric acid which corrodes aluminum wire to impair reliability of the semiconductor device.

To solve the problem, Japanese Patent No. 2843244 discloses an epoxy resin composition comprising a compound, as a flame retardant, comprising red phosphorous coated with a layer consisting of $Si_xO_y$. However, the aforesaid problem caused by humidity has not been resolved yet.

Japanese Patent Application Laid-Open No. 10-259292 discloses an epoxy resin comprising a cyclic phosphazene compound as a phosphorous flame retardant. However, the phosphoric acid compound are formed which have adverse effects on semiconductor device at a high temperature.

Japanese Patent Application Laid-Open No. 11-255955 discloses a capsule type flame retardant consisting of a core material and a coating material. The core material functions as a flame retardant and the coating material is an organic resin having a flexural modulus of at least 2000 kg/mm² at 30° C. such as epoxy resin or acrylic resin. The core material is a metal hydroxide or zinc borate which has low flame retardancy as described above. Further, the capsule type flame retardant is prepared by mechanofusion method which is applicable only to a limited number of combinations of a core material and coating material.

SUMMARY OF THE INVENTION

The present invention is to provide a flame retardant which neither has poisonous property nor impair reliability of semiconductor devices, and to provide a resin composition comprising the flame retardant for encapsulating semiconductor devices.

The present invention is a flame retardant comprising
an inorganic porous fine particle,
a phosphazene compound represented by the following average compositional formula (1)

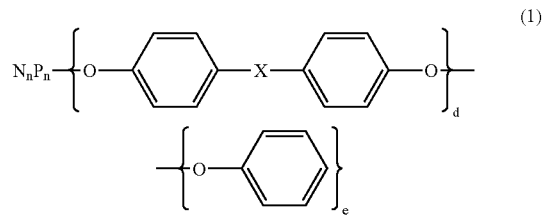

wherein X is selected from the group consisting of a single bond, $CH_2$, $C(CH_3)_2$, $SO_2$, S, O, and $O(CO)O$, n is an integer of from 3 to 1000, d and e are numbers with $2d+e=2n$,
said phosphazene compound being supported on said inorganic porous fine particle, and
a resin layer coating said inorganic porous fine particle with the phosphazene compound supported thereon, said resin thermally decomposing to lose weight by 10% at a temperature of from 300° C. to 500° C. as measured by thermogravimetry in the air at a heating rate of 10° C./min.

The present invention also provides a epoxy resin composition comprising the aforesaid flame retardant for encapsulating semiconductor devices, and a semiconductor device encapsulated the epoxy resin-composition.

The aforesaid present flame retardant, unlike antimony or halogens, does not have poisonous property. It does not impair reliability of semiconductor devices because of the resin coating layer which prevent hydrolysis of the phosphazene even in a highly humid environment. The resin layer has thermal decomposition property suitable for the phosphazene compound to function as a flame retardant at a high temperature. Semiconductor devices encapsulated with the present resin composition can attain V-0 in UL-94 standards.

DESCRIPTION OF THE PREFERRED EMBODIMENTS

The present flame retardant comprises as an active ingredient the phosphazene compound represented by the following average compositional formula (1):

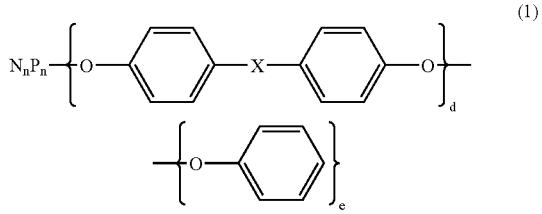

wherein X is a group selected from the group consisting of a single bond, $CH_2$, $C(CH_3)_2$, $SO_2$, S, O, and $O(CO)O$, n is an integer of from 3 to 1000, d and e are numbers with $2d+e=2n$, In the formula (1), n ranges from 3 to 1000, preferably from 3 to 10, particularly 3, from the viewpoint of synthesis of such compound.

Preferably, a ratio of d to n ranges from 0 to 0.25 and e to n from 1.5 to 2 with $2d+e=2n$. When X is a single bond, the moiety

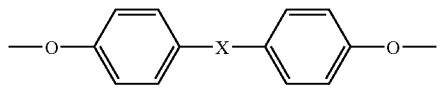

represents the following moiety.

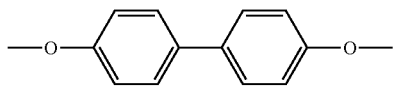

The resin coating the particle with the phosphazene compound supported thereon loses its weight by 10% by thermal decomposition at a temperature of 300° C. or higher, preferably a temperature of 340° C. or higher. The amount of weight loss can be measured by thermogravimetry in the air at a heating rate of 10° C./min.

If the aforesaid 10 wt % weight loss occurs at a temperature below 300° C., phosphazene compound may be exposed at a lower temperature than burning temperature to come into contact with a semiconductor device and damage it. If 10 wt % weight loss occurs at a temperature above 500° C., the phosphazene compound may be prohibited from functioning as a flame retarder.

Examples of the resin or resin composition constituting the coating layer include epoxy resin, bismaleimide resin, silicone resin, cyanate ester resin, methylmethacrylate/butadiene/styrene resin, polystyrene resin and curing agentg, as needed. Preferably, a resin composition comprising an epoxy resin and a phenolic hardner, and a bismaleimide resin and AIBN, i.e., azobisisobutyronitrile, are used. The amount of the resin or resin composition may vary depending on a specific surface area of the porous fine particle and amount of the phosphazene compound, but typically ranges from 0.05 to 1.5 parts by weight, more typically from 0.1 to 0.5 part by weight per 1 part by weight of the phosphazene compound.

The porous inorganic fine particle supporting the aforesaid phosphazene compound is selected from the group consisting of silicon dioxide, calcium silicate, apatite, and zeolite, among which silicon dioxide is preferred. The particle has a mean particle size of from 0.5 to 20 μm, preferably from 1 to 10μm, and a specific surface area of from 100 to 600 $m^2/g$, preferably from 150 to 400 $m^2/g$.

The present flame retardant can be prepared by the following steps.

(1) Dissolving the phosphazene compound in a solvent to prepare a solution of the phosphazene compound, (2) Adding the solution of the phosphazene compound to the inorganic porous fine particle at a reduced pressure and then distilling off the solvent after mixing a predetermined period of time, (3) Dissolving the coating resin or resin composition in a solvent to prepare a solution of the coating resin, (4) Adding the solution of the coating resin to the inorganic porous fine particle with the phosphazene compound supported thereon at a reduced pressure and then distilling off the solvent after mixing a predetermined period of time, (5) Heating the inorganic porous fine particle coated with the resin or the resin composition to cure the resin or the resin composition as needed.

The step (3) may be performed in parallel with the step (1).

The reduced pressure in the steps (2) and (4) may be within a pressure range where the phosphazene compound does not evaporate and preferably adjusted according to the solvent and a pore size of the porous fine particle.

The phosphazene compound of the formula (1) is contained in the present flame retardant preferably in an amount of from 10 to 60 wt %, more preferably from 30 to 60 wt %. A flame retardant containing the phosphazene compound less than the aforesaid lower limit may has a low flame retardance per weight, so that a large amount of the retard must be incorporated in an epoxy resin composition to attain desired flame retardance, which is disadvantageous in view of production cost. On the other hand, it is normally difficult, though depending on specific surface area of the porous fine particle, to support the phosphazene compound more than the aforesaid upper limit.

The present flame retardant thus prepared has high heat resistance. Because protected with a thermally stable resin or resin composition, the phosphazene compound does not decompose at a temperature below 300° C. The flame retardant is highly resistant to water, so that no phosphate ion leaches out in water. When it is exposed to a high temperature in combustion, the coating resin layer decomposes and phosphazene compound exposed demonstrates flame retardance.

The present invention also provide an epoxy resin composition for encapsulating semiconductor devices comprising the aforesaid present flame retardant, hereinafter referred to as the flame retardant (A). The flame retardant (A) is incorporated in the composition in an amount of from 5 to 50 parts by weight, preferably from 5 to 30 parts by weight per total 100 parts by weight of the after-mentioned (B) epoxy resin and (C) curing agent. Flow property or moldability of the composition can be adjusted by particle size and content of the porous fine particle of the flame retardant (A).

(B) Epoxy Resin

Examples of the epoxy resin(B) include novolac type epoxy resins, cresol novolac type epoxy resins, triphenolalkane type epoxy resins, aralkyl type epoxy resins, biphenyl moiety-containing aralkyl type epoxy resins, biphenyl type epoxy resins, dicyclopentadiene type epoxy resins, heterocyclic epoxy resins, naphthalene ring-containing epoxy resins, bisphenol A type epoxy compounds, bisphenol F type epoxy compounds, stilbene type epoxy resins and a mixture thereof. Among these, aromatic epoxy resins such as cresol novolac type epoxy resins, triphenolalkane type epoxy resins are preferred. It should be noted that a brominated epoxy resin is not used in the present invention.

The aforesaid epoxy resin (A) preferably has a hydrolyzable chlorine content of at most 1,000 ppm, more preferably at most 500 ppm, a sodium content of at most 10 ppm, and a potassium content of at most 10 ppm. If the content of hydrolyzable chlorine is more than 1,000 ppm or if the content of sodium or potassium is more than 10 ppm, an semiconductor device encapsulated with such an epoxy resin may not be resistant to a hot and humid environment.

(C) Curing Agent

Component (C) preferably is a phenolic resin. Examples of the phenolic resin include phenolic novolac resins, naphthalene ring-containing phenolic resins, aralkyl type phenolic resins, triphenolalkane type phenolic resins, biphenyl skeleton-containing aralkyl type phenolic resins, biphenyl type phenolic resins, alicyclic phenolic resins, heterocyclic phenolic resins, phenolic resins having a naphthalene ring, bisphenol-type phenolic resins such as bisphenol A and bisphenol F type phenolic resins, and a mixture thereof.

The aforesaid phenolic resin preferably has a sodium content of at most 10 ppm, and a potassium content of at most 10 ppm, for the same reason as described above for the epoxy resin.

The curing agent (C) may be used in an amount enough to harden the epoxy resin (B). When the curing agent (C) is the phenolic resin, it is used in such an amount that a molar ratio of the phenolic hydroxyl groups in the curing agent (C) to epoxy groups in the epoxy resin (B) ranges from 0.5 to 1.5, and more preferably from 0.8 to 1.2.

In the preset invention, a curing accelerator is preferably used to promote reaction between the epoxy resin and the curing agent. Examples of the curing accelerator include phosphorus compounds such as triphenylphosphine, tributylphosphine, tri(p-methylphenyl)phosphine, tri(nonylphenyl)phosphine, triphenylphosphine triphenylborane, tetraphenylphosphine tetraphenylborate, and the addition product of triphenylphosphine and p-benzoquinone; tertiary amine compounds such as triethylamine, benzyldimethylamine, α-methylbenzyldimethylamine, and 1,8-diazabicyclo[5.4.0]undecene-7; and imidazole compounds such as 2-ethyl-4-methylimidazole, 2-methylimidazole, 2-phenylimidazole, and 2-phenyl-4-methylimidazole.

When the phenolic resin is used as the component (C), the curing accelerator may be used in an amount of from 0.1 to 5 parts by weight, particularly from 0.5 to 2 parts by weight per total 100 parts by weight of the components (B) and (C).

Inorganic Filler (D)

As the inorganic filler (D), any inorganic filler commonly incorporated in an epoxy resin may be used. Examples include silica such as fused silica and crystalline silica, alumina, silicon nitride, aluminum nitride, boron nitride, titanium oxide, and glass fibers.

There is no limitation on particle size, shape, and content of the inorganic filler. To increase flame retardance, the inorganic filler is contained as much as possible in the epoxy resin composition as far as the composition is moldable. Preferably, spherical fused silica having a mean particle size of from 5 to 30 μm is used.

In the present invention, a mean particle size is determined as a weight average particle size or a median size by the laser light diffraction technique, for example.

Preferably, the inorganic filler is surface treated before adding to the composition with a coupling agent such as a silane coupling agent or a titanate coupling agent in order to increase the bonding strength to the resin. Preferred coupling agents include silane coupling agents including epoxy silanes such as γ-glycidoxypropyltrimethoxysilane, γ-glycidoxypropylmethyldiethoxy-silane, and β-(3,4-epoxycyclohexyl)ethyltrimethoxysilane; amino silanes such as N-β-(aminoethyl)-γ-aminopropyltrimethoxysilane-, the reaction product of imidazole with γ-glycidoxypropyltrimethoxy-silane, γ-aminopropyltriethoxysilane, and N-phenyl-γ-aminopropyl-trimethoxysilane; and mercapto silanes such as γ-mercaptosilane and γ-episulfidoxypropyltrimethoxysilane, and a mixture thereof.

There is no particular limitation on the amount of the coupling agent used for surface treatment or the method of surface treatment.

Other Components

The epoxy resin composition of the present invention may include various additives in an amount not to adversely affect the composition.

Examples of the additives include non-antimony flame retardant other than the flame retardant (A), for example, hydroxides such as aluminum hydroxide and magnesium hydroxide, inorganic compounds such as zinc borate, zinc stannate, and zinc molybdate; stress reducing agents such as thermoplastic resins, thermoplastic elastomers, organic synthetic rubbers, and silicones; lubricants such as carnauba wax, higher fatty acid, and synthetic wax; colorants such as carbon black; and halogen trapping agents such as hydrotalcite compounds, zirconium phosphates and bismuth hydroxides; and silane coupling agent to increase adhesion to a semiconductor device.

Other examples of the lubricants include rice wax, polyethylene, oxidized polyethylene wax, montanic acid, montanwaxe, which is an ester of montanic acid with saturated alcohols, 2-(2-hydroxyethylamino)ethanol, ethylene glycol, glycerin or the like; stearic acid, stearic acid esters, stearyl amide, ethylene bis-stearyl amide, ethylene-vinyl acetate copolymer, and a mixture thereof. The lubricant is incorporated in the composition in an amount of from 0.1 to 5 parts by weight, preferably from 0.3 to 4 parts by weight per total 100 parts by weight of (B) and (C).

Examples of the silane coupling agent include, besides the aforesaid coupling agents used for surface treatment of the filler, γ-glycidoxypropyltriethoxysilane, p-styryltrimethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-mercaptopropylmethyldimethoxysilane, bis(triethoxypropyl)tetrasulfide, and γ-isocyanatepropyltriethoxysilane.

Preparation of the Epoxy Resin Composition

The epoxy resin composition of the present invention may be prepared by blending the aforesaid components (A) to (D) and optional additives in a predetermined proportion, and thoroughly mixing the blend in a mixer or ball mill, and then kneading the mixture with a hot roll mill, kneader, or extruder. The mixture thus obtained is cooled and solidified, and then pulverized to a suitable size as a molding material, if desired.

The present epoxy resin composition thus prepared is useful for encapsulating semiconductor devices. Encapsulation may be performed by a low-pressure transfer molding, for example. Molding is preferably carried out at a temperature of from 150 to 180° C. for 30 to 180 seconds, followed by post curing at a temperature of from 150 to 180° C. for 2 to 16 hours.

The present epoxy resin composition has a good continuous moldability. The phosphazene compound is not decomposed even if a cured product of the composition is placed in water as demonstrated in the following Examples.

EXAMPLES

The present invention will be explained with reference to the following examples, but not limited thereto.

Synthesis Example 1

Phosphazene Compound A-1

In nitrogen atmosphere, 8.6 g (214 mmol) of sodium hydride was suspended in 50 ml of THF at 0° C. To the suspension, a solution of 19.8 g (211 mmol) of phenol dissolved in 75 ml of THF was added dropwise and stirred for 30 minutes. To the mixture obtained, a solution of 12.0 g (34.5 mmol) of hexachlorotriphosphazene in 75 ml of THF was added dropwise and heated under reflux for 18 hours. After THF was distilled off at a reduced pressure, methanol was added to the distillation residue. Crystals precipitated were washed with methanol and water, and 23.8 g of white crystals of phosphazene compound A-1 represented by the following formula was obtained.

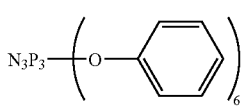
(A-1)

Synthesis Example 2

Phosphazene Compound B-1

In nitrogen atmosphere, 4.8 g (119 mmol) of sodium hydride was suspended in 50 ml of THF at 0° C. To the suspension, a solution of 10.2 g (108 mmol) of phenol and 0.45 g (1.8 mol) of 4,4'-sulfonyldiphenol dissolved in 50 ml of THF was added dropwise and stirred for 30 minutes. To the mixture obtained, a solution of 12.5 g (36.0 mmol) of hexachlorotriphosphazene in 50 ml of THF was added dropwise and heated under reflux for 5 hours. To the mixture obtained, a suspension prepared by suspending 5.2 g (130 mmol) of sodium hydride in 50 ml of THF at 0° C. was added dropwise and then a solution of 11.2 g (119 mmol) of phenol in 50 ml THF was added dropwise, and heated for another 19 hours under reflux. After THF was distilled off at a reduced pressure, chlorobenzene was added to dissolve the distillation residue. The solution obtained was extracted with 200 ml of 5% NaOH aqueous solution for 2 times, 200 ml of 5% $H_2SO_4$ aqueous solution for 2 times, 200 ml of 5% sodium bicarbonate aqueous solution for 2 times, and 200 ml of water for 2 times, in sequence. Water was distilled off at a reduced temperature and 20.4 g of the phosphazene compound B-1 represented by the following formula was obtained.

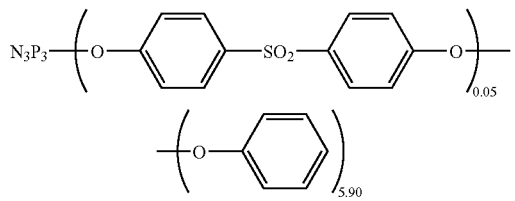
(B-1)

Example 1

In a vacuum chamber, 50 parts by weight of porous silica fine particles, SS-150, ex Mitsubishi Rayon Co., Ltd., having a mean particle size of 8.8 μm and a specific surface area of 155 m²/g were placed. A solution of the phosphazene compound A-1 was prepared by dissolving 40 parts by weight of the phosphazene compound A-1 in 100 parts by weight of acetone. Separately, an epoxy resin solution was prepared by dissolving 6 parts by weight of an epoxy resin, GTR-1800, ex Nippon Kayaku Co., Ltd., 4 parts by weight of a curing agent, MEH-7500, ex Meiwa Plastic Industries, Ltd., and 0.3 part by weight of triphenylphosphine in 100 parts by weight of acetone.

To the silica fine particles, 140 parts by weight of the aforesaid solution of A-1 was added dropwise through a sealed port of the chamber and left to stand for 30 minutes, and then stirred for 30 minutes to allow the solution to impregnate the porous silica fine particle. Then, the pressure inside the chamber was returned to atmospheric pressure and then reduced again to distill off acetone at 60° C. Subsequently, 110.3 parts by weight of the epoxy resin solution was added dropwise through the sealed port to the silica fine particles and left to stand for 30 minutes, and then stirred for 30 minutes to allow the solution to impregnate the porous silica fine particles. Then, the pressure inside the chamber was returned to atmospheric pressure and then reduced again to distill off acetone at 60° C. The porous silica fine particles coated with the epoxy resin composition were heated in a dryer to 180° C. for 4 hours to cure the epoxy resin and thereby flame retardant-1 was obtained which had 40 wt % of the phosphazene compound A-1 and the epoxy resin coating layer.

Separately, a cured product of the epoxy resin composition was prepared from the epoxy resin solution prepared as above by distilling off acetone at 60° C. at a reduced temperature and then heating the distillation residue at 180° C. for 4 hours. The cured product was analyzed by thermogravimetry using a thermal analyzer, Thermo plus TG 8120, ex Rigaku Corp. in the air at a heating rate of 10° C./min. It was found that the cured product lost its weight by 10 by thermal decomposition at 345° C.

Example 2

In a vacuum chamber, 40 parts by weight of porous silica fine particles, SE-MCB-FP-2, ex ENEX CO., Ltd., having a mean particle size of 3.2 μm and a specific surface area of 242 m²/g were placed. A solution of the phosphazene compound B-1 was prepared by dissolving 55 parts by weight of the phosphazene compound B-1 in 100 parts by weight of acetone. Separately, a bismaleimide resin solution was prepared by dissolving 4.8 parts by weight of a bismaleimide resin, BMI, ex KI Chemical Industry Co., Ltd., and 0.2 part by weight of AIBN, ex NOF CORPORATION, in 100 parts by weight of acetone.

To the silica fine particles, 155 parts by weight of the aforesaid solution of B-1 was added dropwise through a sealed port of the chamber and left to stand for 30 minutes, and then stirred for 30 minutes to allow the solution to impregnate the porous silica fine particles. Then, the pressure inside the chamber was returned to atmospheric pressure and then reduced again to distill acetone at 60° C. Subsequently, 105.0 parts by weight of the coating solution was added dropwise through the sealed port to the silica fine particles and left to stand for 30 minutes, and then stirred for 30 minutes to allow the solution to impregnate the porous silica fine particles. Then, the pressure inside the chamber was returned to atmospheric pressure and then reduced again to distill acetone at 100° C. The porous silica fine particles coated with the bismaleimide resin composition were heated in a drier to 180° C. for 2 hours and then 220° C. for 2 hours to cure the bismaleimide resin and thereby flame retardant-2 was obtained which had 55 wt % of the phosphazene compound B-1 and the bismaleimide resin coating layer.

Separately, a cured product of the bismaleimide resin composition was prepared from the bismaleimide resin solution prepared as above by distilling off acetone at 60° C. at a reduced temperature and then heating the distillation residue at 180° C. for 2 hours followed by heating at 220° C. for 2 hours. The cured product was analyzed by thermogravimetry in the same manner as in Example 1. It was found that the cured product lost its weight by 10% by thermal decomposition at 360° C.

Referential Example 1

In a vacuum chamber, 50 parts by weight of porous silica fine particles, SS-150, ex Mitsubishi Rayon Co., Ltd., having a mean particle size of 8.8 µm and a specific surface area of 155 m$^2$/g were placed. A solution of the phosphazene compound A-1 was prepared by dissolving 40 parts by weight of the phosphazene compound A-1 in 100 parts by weight of acetone. Separately, a PES resin solution was prepared by dissolving 10 parts by weight of PES resin, 4100 M, ex Sumitomo Chemical Co., Ltd., in 100 parts by weight of N-methyl-2-pyrolidone while heating at 60° C.

To the porous silica fine particles, 140 parts by weight of the aforesaid solution of A-1 was added dropwise through a sealed port of the vacuum chamber and left to stand for 30 minutes, and then stirred for 30 minutes to allow the solution to impregnate the porous silica fine particle. Then, the pressure inside the chamber was returned to atmospheric pressure and then reduced again to distill acetone at 60° C. Subsequently, 110 parts by weight of the PES resin solution was added dropwise through the sealed port to the silica fine particles at 60° C. and left to stand for 30 minutes, and then stirred for 30 minutes to allow the solution to impregnate the porous silica fine particles. Then, the pressure inside the chamber was returned to atmospheric pressure and then N-methyl-2-pyrolidone was filtered out. The porous silica fine particles were heated in a drier to 200° C. for 2 hours and thereby flame retardant-3 was obtained which had 40 wt % of the phosphazene compound A-1 and the PES resin coating layer.

The PES resin was analyzed by thermogravimetry in the same manner as in Example 1. It was found that the PES resin lost its weight by 10% by thermal decomposition at a temperature above 500° C.

Referential Example 2

In a vacuum chamber, 50 parts by weight of porous silica fine particles, SS-150, ex Mitsubishi Rayon Co., Ltd., having a mean particle size of 8.8 µm and a specific surface area of 155 m$^2$/g were placed. A solution of the phosphazene compound A-1 was prepared by dissolving 40 parts by weight of the phosphazene compound A-1 in 100 parts by weight of acetone. Separately, a PMMA resin solution was prepared by dissolving 10 parts by weight of PMMA resin, ex Soken Chemical & Engineering Co., Ltd., in 100 parts by weight of acetone.

To the porous silica fine particles, 140 parts by weight of the aforesaid solution of A-1 was added dropwise through a sealed port to the silica fine particle and left to stand for 30 minutes, and then stirred for 30 minutes to allow the solution to impregnate the porous silica fine particle. Then, the pressure inside the chamber was returned to atmospheric pressure and then reduced again to distill off acetone at 60° C. Subsequently, 110 parts by weight of the PMMA resin solution was added dropwise through the sealed port to the silica fine particles and left to stand for 30 minutes, and then stirred for 30 minutes to allow the solution to impregnate the porous silica fine particles. Then, the pressure inside the chamber was returned to atmospheric pressure. The pressure was reduced again to distill off acetone at 60° C., and flame retardant-4 was obtained which had 40 wt % of the phosphazene compound A-1 and the PMMA resin coating layer.

The PMMA resin was analyzed by thermogravimetry in the same manner as in Example 1. It was found that the PMMA resin lost 10 wt % by thermal decomposition at a temperature of 240° C.

Comparative Example 1

Flame retardant-5 was prepared with a mechanofusion system, ex HOSOKAWAMICRON Corp., by impacting, in a fast gas stream, 80 parts by weight of magnesium hydroxide, Kisuma 8N, ex Kyowa Chemical Industry Co., Ltd., with resin fine particles having a particle size of from 10 to 50 µm prepared by melt-blending 6 parts by weight of an epoxy resin, GTR-1800, ex Nippon Kayaku Co., Ltd., 3.5 parts by weight of a curing agent, MEH-7500, ex Meiwa Plastic Industries, Ltd., and 0.5 part by weight of triphenylphosphine and then pulverizing the blend.

Examples 3-7, Referential Examples 4-6, Comparative Examples 2-3

Components shown in Table 1 were melt-blended with a heated twin roll. After cooled, the blend obtained was pulverized and thereby an epoxy resin composition for encapsulating semiconductor devices were obtained. On each composition, the following properties (i) to (vii) were measured. The results are as shown in Table 1.

Comparative Example 4

Using the mechanofusion system, ex HOSOKAWAMICRON Corp., 40 parts by weight of the phosphazene compound A-1 were impacted, in a fast gas stream, with resin fine particles having a particle size of from 10 to 50 µm prepared by melt-blending 36 parts by weight of an epoxy resin, GTR-1800, ex Nippon Kayaku Co., Ltd., 23 parts by weight of a curing agent, MEH-7500, ex Meiwa Plastic Industries, Ltd., and 3 part by weight of triphenylphosphine and then pulverizing the blend. However, the compound A-1 were mixed with the resin blend, so that a capsule type flame retardant could not be obtained.

(i) Spiral Flow

Spiral flow of each composition was measured by molding the composition in a mold according to EMMI standards at a molding temperature of 175° C. and pressure of 6.9 N/mm² for 120 seconds.

(ii) Hardness of Cured Product

From each composition, a test piece having a dimension of 10×4×100 mm was molded at a molding temperature of 175° C. and a pressure of 6.9 N/mm² for 90 seconds. A hardness of the test piece at 175° C. was measured with a Barcol Impresser according to the Japanese Industrial Standards (JIS) K-6911.

(iii) Flame Retardance

From each composition, a 1/16-inch thick plate was molded at a molding temperature of 175° C. and pressure of 6.9 N/mm² for 120 seconds and post-cured at 180° C. for 4 hours. Flame retardance was determined according to the UL94 flammability testing method.

(iv) Phosphate Ions

From each composition, a disk of 50 mm in diameter by 3 mm in thickness was molded at a molding temperature of 175° C. and pressure of 6.9 N/mm² for 90 seconds, and post-cured at 180° C. for 4 hours. After keeping the disk at a 175° C. for 1,000 hours, it was pulverized with a disk mill into fine particles. In a pressure cooker, 50 ml of pure water and 10 g of the particles having a particle size of from 63 to 212 μm were placed, which was kept at a temperature of 125° C. for 20 hours. After cooled to room temperature, the particles were filtered out and the filtrate was analyzed for phosphate ion by ion chromatography.

(v) Resistivity at a High Temperature

From each composition, a disk of 70 mm in diameter by 3 mm in thickness was molded at a molding temperature of 175° C. and pressure of 6.9 N/mm² for 120 seconds, and post-cured at 180° C. for 4 hours. A volume resistivity of the disk was measured at 150° C.

(vi) Moisture Resistance

A 6 mm×6 mm silicon chip, on which 5 μm wide aluminum wirings and electrodes are formed at an interval of 5 μm, was bonded to a 14-pin DIP frame made of 42 alloy. The aluminum electrodes on the chip were wirebonded to the frame with gold wires having a diameter of 25 μm. The flame with the chip bonded thereon was encapsulated with each composition at a molding temperature of 175° C. and pressure of 6.9 N/mm² for 120 seconds. The encapsulated device was heated at a temperature of 180° C. for 4 hours to post-cure the molded composition. Twenty device packages thus obtained for each composition were left to stand for 500 hours in an atmosphere of 130° C. with a relative humidity of 85% while a bias voltage of −20 V DC being applied. The number of packages in which aluminum corrosion occurred was counted.

(viii) Heat Resistance

A 6 mm×6 mm silicon chip, on which 5 μm wide aluminum wirings and electrodes are formed at an interval of 5 μm, was bonded to a 14-pin DIP frame made of 42 alloy. The aluminum electrodes on the chip were wirebonded to the frame with gold wires having a diameter of 25 μm. The flame with the chip bonded thereon was encapsulated with each composition at a molding temperature of 175° C. and pressure of 6.9 N/mm² for 120 seconds. The encapsulated device was heated at a temperature of 180° C. for 4 hours to post-cure the molded composition. Twenty device packages thus obtained for each composition were left to stand for 500 hours in an atmosphere of 130° C. with a relative humidity of 85% while a bias voltage of −5 V DC being applied. Resistivity was measured and averaged on twenty packages.

The components (B) to (D) and additives shown in Table 1 are as follows.

Component (B)

Epoxy resin-1: o-cresol novolac epoxy resin having an epoxy equivalent of 200, EOCN 1020-55, ex Nippon Kayaku Co., Ltd.

Epoxy resin-2: triphenylmethane-type epoxy resin having an epoxy equivalent of 165, EPPN-501H, ex Nippon Kayaku Co., Ltd.

Component (c)

Curing agent-1: phenol novolac resin having an phenolic hydroxyl equivalent of 110, DL-92, ex Meiwa Plastic Industries, Ltd.

Curing agent-2: triphenylmethane-type phenolic resin having phenolic hydroxyl equivalent of 97, MEH-7500, ex Meiwa Plastic Industries, Ltd.

Component (D)

Inorganic filler: spherical fused silica having a mean particle size of 20 μm, ex Tasumori Co.

Additives

Curing accelerator: triphenyl phosphine, ex Hokko Chemical Industry Co., Ltd.

Releasing agent: carnauba wax, ex Nikko Fine Products K. K.

Carbon black: Denka black, ex Denki Kagaku Kogyo K. K.

Silane coupling agent: KBM-403, ex Shin-Etsu Chemical Co., Ltd.

TABLE 1

| | | | Examples | | | | | Referential Examples | | Comparative Examples | | |
|---|---|---|---|---|---|---|---|---|---|---|---|---|
| | Components(parts by weight) | | 3 | 4 | 5 | 6 | 7 | 1 | 2 | 1 | 2 | 3 |
| (A) | Flame retardant-1 | | 20 | | 50 | | 30 | | | | | |
| | Flame retardant-2 | | | 10 | | 30 | | | | | | |
| Flame | Flame retardant-3 | | | | | | | 20 | | | | |
| retardant | Flame retardant-4 | | | | | | | | 20 | | | |
| other | Flame retardant-5 | | | | | | | | | 150 | | |
| than | Phosphazene compound A-1 | | | | | | | | | 8 | | |
| (A) | Brominated epoxy resin | | | | | | | | | | | 10 |
| | Antimony trioxide | | | | | | | | | | | 10 |

TABLE 1-continued

|  | Components(parts by weight) |  | Examples 3 | Examples 4 | Examples 5 | Examples 6 | Examples 7 | Referential Examples 1 | Referential Examples 2 | Comparative Examples 1 | Comparative Examples 2 | Comparative Examples 3 |
|---|---|---|---|---|---|---|---|---|---|---|---|---|
| (B) | Epoxy resin-1 |  | 59 | 59 |  |  |  | 59 | 59 |  | 59 | 50 |
|  | Epoxy resin-2 |  |  |  | 65 | 65 | 60 |  |  | 65 |  |  |
| (C) | Curing agent-1 |  | 33 | 33 |  |  | 40 | 33 | 33 |  | 33 |  |
|  | Curing agent-2 |  |  |  | 35 | 35 |  |  |  | 35 |  | 40 |
| (D) | Inorganic filler |  | 600 | 600 | 600 | 600 | 600 | 600 | 600 | 600 | 600 | 600 |
| Additives | Curing accelerator |  | 1.0 | 1.0 | 1.0 | 1.0 | 1.0 | 1.0 | 1.0 | 1.0 | 1.0 | 1.0 |
|  | Releasing agent |  | 1.5 | 1.5 | 1.5 | 1.5 | 1.5 | 1.5 | 1.5 | 1.5 | 1.5 | 1.5 |
|  | Carbon black |  | 1.5 | 1.5 | 1.5 | 1.5 | 1.5 | 1.5 | 1.5 | 1.5 | 1.5 | 1.5 |
|  | Silane coupling agent |  | 1.0 | 1.0 | 1.0 | 1.0 | 1.0 | 1.0 | 1.0 | 1.0 | 1.0 | 1.0 |
| Evaluation Results | (i) Spiral flow | cm | 100 | 110 | 90 | 100 | 110 | 100 | 100 | 35 | 110 | 100 |
|  | (ii) Hardness of cured product |  | 85 | 85 | 85 | 85 | 88 | 85 | 85 | 70 | 80 | 85 |
|  | (iii) Flame retardance | UL-94 | V-0 | V-0 | V-0 | V-0 | V-0 | burn out | V-0 | V-0 | V-0 | V-0 |
|  | (iv) Extracted phosphate ion | ppm | <5 | <5 | <5 | <5 | <5 | <5 | 60 | <5 | 120 | <5 |
|  | (v) High Temperature Resistivity | GΩm | 300 | 310 | 850 | 830 | 550 | 300 | 55 | 200 | 1.5 | 300 |
|  | (vi) Moisture Resistance | Failure | 0/20 | 0/20 | 0/20 | 0/20 | 0/20 | 0/20 | 11/20 | 20/20 | 0/20 | 0/20 |
|  | (vii) Heat Resistance | Ω | 16 | 16 | 16 | 16 | 16 | 16 | 31 | 25 | 30 | ∞ (break) |

As can be seen from Table 1, the present epoxy resin compositions comprising the present flame retardant have good molding property to give cured products having superior flame retardance, moisture resistance and heat resistance. In the flame retardant-3 in Referential Example 1, the flame retardance of the phosphazene compound was not exerted due to too high thermal decomposition temperature of the coating resin. On the other hand, in the flame retardant-4 in Referential Example 2, the phosphazene compound was exposed to water due to too low thermal decomposition temperature of the coating resin to form phosphate ions, which decreased volume resistivity at a high temperature. The flame retardant-5 in Comparative Example 1 should be incorporated in an amount of 150 parts by weight to attain V-0 due to lower flame retardance of its active ingredient, magnesium hydroxide than the phosphazene compound. In Comparative Example 3, the wiring was corroded to break with bromine radicals formed by decomposition of the brominated epoxy resin.

The invention claimed is:

1. A flame retardant comprising
an inorganic porous fine particle selected from the group consisting of silicon dioxide, calcium silicate, apatite, alumina, and zeolite, each having a mean particle size of from 0.5 to 20 μm and a specific surface area of from 100 to 600 m²/g,
a phosphazene compound represented by the following average compositional formula (1)

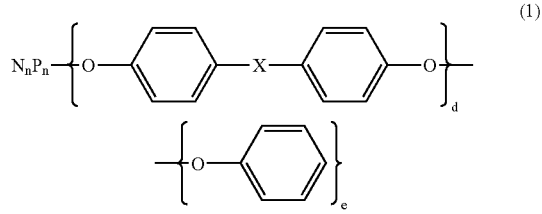

(1)

wherein X is selected from the group consisting of a single bond, $CH_2$, $C(CH_3)_2$, $SO_2$, S, O, and $O(CO)O$, n is an integer of from 3 to 1000, d and e are numbers with $2d+e=2n$,
said phosphazene compound being supported on said inorganic porous fine particle, and
a resin layer coating said inorganic porous fine particle with the phosphazene compound supported thereon, said resin thermally decomposing to lose weight by 10% at a temperature of from 300° C. to 500° C. as measured by thermogravimetry in the air at a heating rate of 10° C./min.

2. The flame retardant according to claim 1, wherein said resin layer comprises an epoxy resin or a bismaleimide resin.

3. The flame retardant according to claim 1, wherein said phosphazene compound is contained in an amount of from 10 to 60 weight % in the flame retardant.

4. An epoxy resin composition for encapsulating semiconductor devices, said composition comprising
(A) a flame retardant according to any one of claims 1, 2, or 3,
(B) an epoxy resin,
(C) a curing agent, and
(D) an inorganic filler,
wherein said flame retardant (A) is contained in an amount of from 5 to 50 parts by weight per total 100 parts by weight of the epoxy resin (B) and the hardener (C), and said composition comprises neither brominated compounds nor antimony compounds.

5. A semiconductor device encapsulated with a cured product of an epoxy resin composition comprising
(A) a flame retardant according to any one of claims 1, 2, or 3,
(B) an epoxy resin,
(C) a curing agent, and
(D) an inorganic filler,
wherein said flame retardant (A) is contained in an amount of from 5 to 50 parts by weight per total 100 parts by weight of the epoxy resin (B) and the hardener (C), and said composition comprises neither brominated compounds nor antimony compounds.

* * * * *